United States Patent [19]

Pearson

[11] 4,355,266
[45] Oct. 19, 1982

[54] EDDY CURRENT SERVO SYSTEM FOR CONTROLLING THE ROTATION OF DISK PACKS

[75] Inventor: Willard C. Pearson, Redwood City, Calif.

[73] Assignee: Ampex Corporation, Redwood City, Calif.

[21] Appl. No.: 174,042

[22] Filed: Jul. 31, 1980

[51] Int. Cl.³ .............................................. H02P 7/74
[52] U.S. Cl. ...................................... 318/85; 318/303; 318/314
[58] Field of Search ............... 318/607, 608, 616, 617, 318/618, 614, 314, 625, 318, 303, 85; 310/94, 95

[56] References Cited

U.S. PATENT DOCUMENTS

| | | | |
|---|---|---|---|
| 2,281,954 | 5/1942 | Rinia | 318/303 |
| 3,268,788 | 8/1966 | Branco | 318/314 |
| 3,629,633 | 12/1971 | O'Callaghan | 310/94 |
| 3,828,168 | 8/1974 | O'Callaghan et al. | 310/94 |
| 4,203,046 | 5/1980 | Homann et al. | 310/94 |

Primary Examiner—J. V. Truhe
Assistant Examiner—W. E. Duncanson, Jr.
Attorney, Agent, or Firm—George B. Almeida; Joel D. Talcott

[57] ABSTRACT

A servo system provides phase locked servo control of the rotational speed and phase of one, two, or more, disk packs by operating the disk pack, or packs, approximately 2% faster than desired, and then applying a control current to an existing eddy current brake in the disk pack via a servo circuit to reduce the speed to that desired. The servo circuit regulates the servo control current to the brake via two loops; a phase loop which establishes a pack position relative to an external reference pulse, and a velocity loop which provides compensation to enhance lock-up time and improve overall stability. The summed outputs of both loops provide a composite error signal corresponding to the servo control current.

2 Claims, 2 Drawing Figures

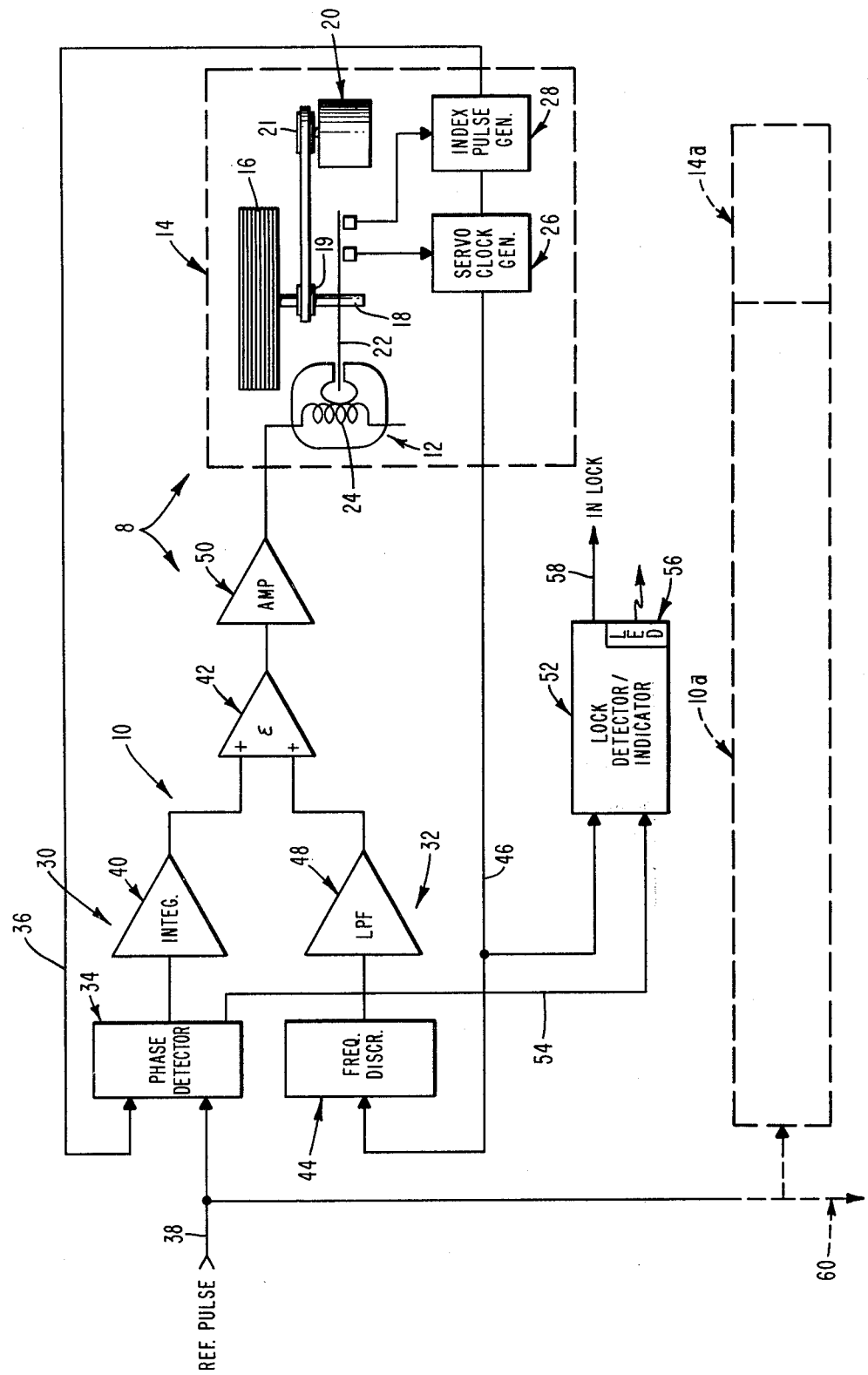

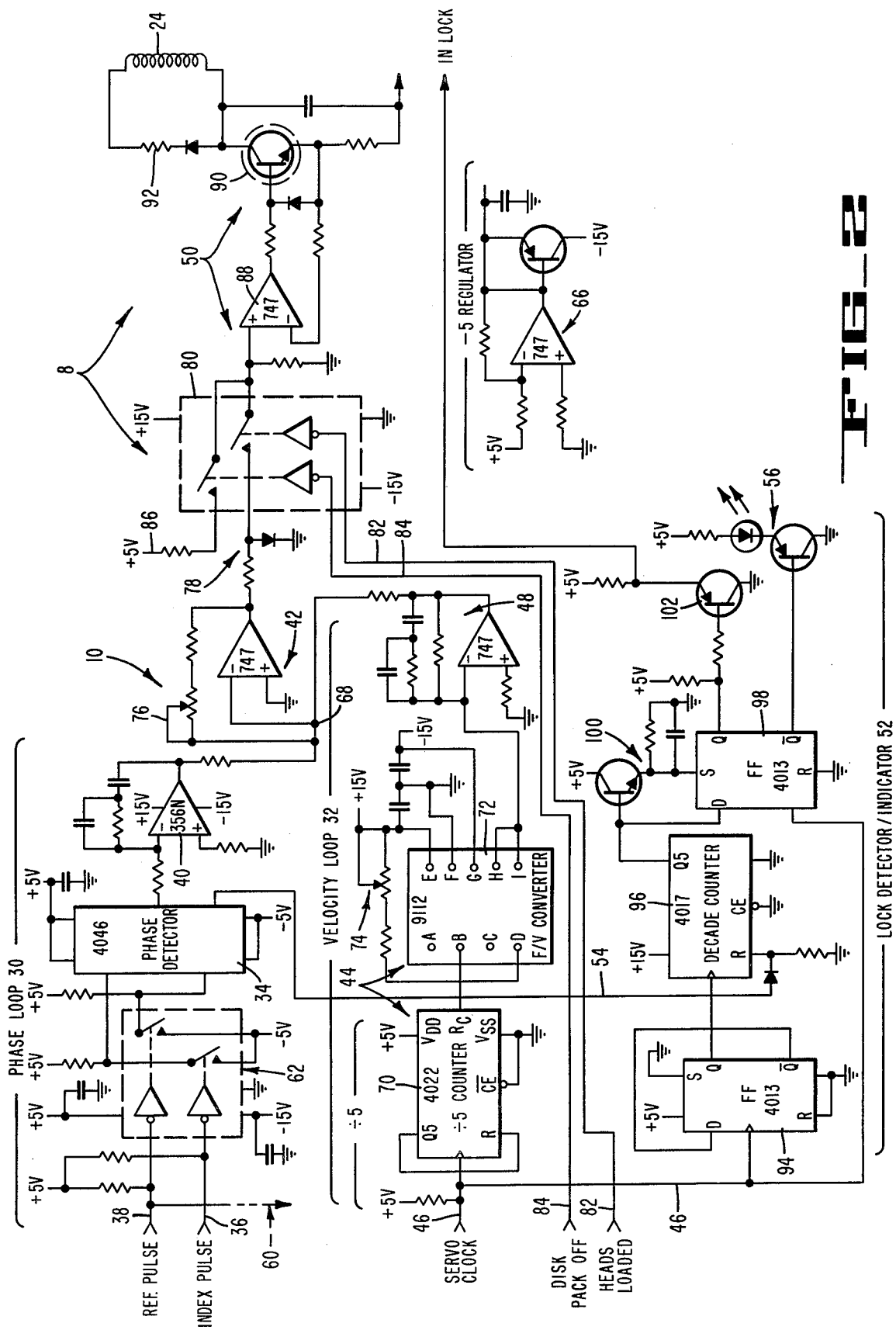

EDDY CURRENT SERVO SYSTEM FOR CONTROLLING THE ROTATION OF DISK PACKS

BACKGROUND OF THE INVENTION

The present invention relates to disk pack servo systems, and particularly to an eddy current brake servo system for use with rotating apparatus having eddy current dynamic brakes.

Disk pack apparatus utilize record/readout heads which must be stepped radially across the rotating disk surface to define consecutive concentric record tracks. Obviously, it takes a finite time for the head to "seek" the next track location, either in the record or replay mode. In addition, the heads must step, or seek, at a specific positional location, e.g., sector zero, on the disk pack, and then settle down sufficiently to allow recording or replay. The delay experienced during the rotation of the disk pack while awaiting the specific positional location where the heads are allowed to seek the next track, is termed the "latency" of the disk pack.

It follows that a single disk pack is incapable of accurately loading the high speed data due to the head seek time and the inherent latency of the disk pack apparatus, i.e., the data cannot wait, for example, for the disk pack to rotate to sector zero.

One way of overcoming the problem is to provide a single disk pack apparatus with very large buffer means to buffer the incoming high speed data to compensate for the latency on the disk pack. Such a system is relatively unwieldly, complex, expensive and generally undesirable.

A second means for providing the transfer of high speed data at very high data rates such as when loading satellite data, utilizes a parallel transfer disk (PTD) system, employing a pair of disk pack apparatus. In such a PTD system, high speed data is loaded into, or read from, one disk pack while the heads seek on the second disk pack. The incoming data is then switched to the second disk pack while the heads seek on the first disk pack. This alternate switching between disk packs allows continuous loading, or readout, of high speed data without interruption.

However, in such use of a PTD system, it is imperative that each disk pack is in a precisely correct rotational position, i.e., that the disk packs are locked together to allow switching between them at precisely the right rotational position, for example, at sector zero. Thus, a servo system must be used to precisely control the speed and the positional phase of both disk packs, and to lock the two packs together.

Servo systems are available which servo a motor, such as the large, 1 horsepower, AC motor used in disk pack apparatus, which employ a DC to AC controller to control the frequency to the motor. Such a servo system requires on the order of 1½ horsepower to control the motor, and the servo system itself must handle the relatively large wattage requirements. Such a servo system generally is not efficient, is relatively expensive, and is relatively unreliable.

Eddy current dynamic brakes are commonly used in rotating disk packs, and the like, to provide for quickly stopping the disk pack when the drive is turned off. The brake operates by the application of current through the brake's electromagnetic coil, which causes the generation of flux lines through an integral brake disk attached to the disk pack spindle. These flux lines induce eddy currents which, in turn, develop their own magnetic field. This magnetic field opposes that of the electromagnetic coil, and these two forces opposing each other develop the braking action. The amount of braking force is directly proportional to the rotational speed and flux produced by the electromagnetic coil, whereby the braking reflects this condition.

As may be seen, the dynamic brake is energized only during that period of time when it is desirable to stop the disk pack rotation.

SUMMARY OF THE INVENTION

The eddy current brake servo system described herein utilizes the existing eddy current dynamic brake of the disk pack apparatus not only to stop the disk pack rotation, but also as a means of controlling the speed and the positional phase of the disk pack. Thus the system overcomes the various problems of the prior art, i.e., does not need the excessive power required to control the drive motor itself, since the disk pack itself, rather than the motor, is controlled via the servo digital logic instead. Thus, the drive pulley of the three phase induction motor which drives the disk pack spindle, is replaced with one having a slightly larger diameter, to cause the disk pack to rotate on the order of 2% faster than desired. Current from the servo system is applied to the eddy brake to produce a viscous drag on the brake disk attached to the disk pack spindle, to reduce the speed of the disk pack to the desired operating speed. Control is maintained by the servo control current which either increases or decreases the viscous drag to maintain the correct speed and phase.

To this end, a servo circuit of the system utilizes two loops. A phase loop, including a phase detector and an integrator circuit, establishes the pack position corresponding to a once-around index pulse, relative to an external reference pulse such as a system clock. A second, velocity loop includes a frequency-to-voltage converter and an active low pass filter, and provides compensation to enhance lock-up time and improve overall system stability. The outputs of the phase and velocity loops are summed together and amplified to provide a composite error signal which is used to drive the eddy current brake. A lock indicator provides a digitally derived "in lock" status indication as well as a corresponding logic level.

The servo system preferably is utilized to lock two or more disk packs together; i.e., each tape pack apparatus includes an eddy current brake servo system wherein the relative pack positions are tied to an external reference pulse to precisely locate the disk packs when in the "in lock" condition.

Accordingly, it is an object of the invention to provide a servo system which utilizes an existing eddy current dynamic brake to control the speed and the positional phase of a rotating apparatus with respect to some timing signal.

It is another object to provide a servo system which utilizes an eddy current dynamic brake in two, or more, disk pack apparatus to precisely lock the rotation of the disk packs together.

It is still another object of the invention to provide a servo system for a rotating apparatus having an eddy current dynamic brake, wherein the rotating apparatus is rotated slightly faster than desired, and current from the servo system is applied to the eddy brake to provide a viscous drag on the rotating apparatus to reduce its speed to the desired speed.

It is a further object of the invention to provide a servo system utilizing a phase and a velocity loop, wherein the composite error current signal regulates an eddy current dynamic brake to control the speed of a rotating apparatus.

BRIEF DESCRIPTION OF THE DRAWINGS

FIG. 1 is a block diagram of the eddy current brake servo system of the invention, as employed with an existing current dynamic brake.

FIG. 2 is a schematic diagram of one implementation of the eddy current brake servo system of FIG. 1.

DESCRIPTION OF THE PREFERRED EMBODIMENTS

Referring to FIG. 1, an eddy current brake servo system 8 is defined by an eddy current brake servo circuit 10, and an eddy current dynamic brake 12 of a disk pack apparatus 14. The disk pack apparatus is generally conventional and includes a disk pack 16 secured for rotation on a spindle 18 which, in turn, is driven by a large three phase induction motor 20 via a belt and respective spindle and motor pulleys 19, 21. A brake disk 22 is also secured to the spindle 18 for rotation therewith, with the outer circumference thereof rotating within the eddy current dynamic brake 12 to define thus a part thereof. The brake 12 also includes an eddy brake electromagnetic coil 24 coupled to the servo circuit 10, and which generates the corresponding braking flux in the brake disk 22, to control the rotation of the disk pack 16. The disk pack apparatus 14 further includes servo clock and index pulse generators 26 and 28 respectively. The servo clock generator 26 detects the speed of rotation of the disk pack 16 in the manner of a tachometer, and generates a selected servo clock frequency. By way of example only, the servo clock is a 403.2 kiloHertz (kHz) clock. The index pulse generator 28 generates a pulse for each revolution of the disk pack 16, i.e., generates a once-around pulse at a specific rotational position on the disk pack 16.

The eddy current brake servo system 8 utilizes the existing eddy current dynamic brake 12 as a means of controlling the speed and the positional phase of the disk pack 16, by controlling the rotation of the disk pack spindle 18 via the brake disk 22. The spindle 18 is belt driven by the AC motor 20, wherein the conventional motor pulley is replaced with the pulley 21 having a slightly larger diameter such that the disk pack 16 rotates approximately 2% faster than desired for proper operation. The servo circuit 10 generates a driving current, as further described below, which is applied to the eddy current dynamic brake 12, and particularly to the brake electromagnetic coil 24. This produces a viscous drag on the brake disk 22 which, in turn, reduces the speed of the spindle and disk pack to the proper desired speed. Thus rotational control is maintained by the servo circuit 10 control current, which increases or decreases the viscous drag to maintain the correct disk pack speed and phase.

Still referring to FIG. 1, the servo circuit 10 includes two feedback loops; a phase loop 30 which establishes the disk pack position relative to an external reference pulse, and a velocity loop 32 which provides compensation to enhance lock-up time and improve overall stability. The action of the phase loop 30 is dominant at very low error signal frequencies, and the velocity loop 32 dominates at the higher error signal frequencies.

To this end, in the phase loop 30, a phase detector 34 receives the index pulse generated by the index pulse generator 28 via a line 36, and also receives an external reference pulse corresponding to the overall system clock, or some derivative of the system clock, via an input line 38. A first output of the phase detector 34 is supplied to an integrator 40 and thence to a summing amplifier 42.

In the velocity loop 32, a frequency discriminator circuit 44 receives the servo clock of 403.2 kHz from the servo clock generator 26 via a line 46, and supplies an output to an active low pass filter 48. The filter 48 also is coupled to the summing amplifier 42. The summing amplifier 42 provides a composite error signal from the phase and velocity loops 30, 32 respectively, which is fed to an eddy coil driver 50. The driver 50 in turn is coupled to the brake electromagnetic coil 24 of previous mention.

A lock detector/indicator circuit 52 is coupled to a second output of the phase detector 34 via a line 54 and also to the 403.2 kHz servo clock from the servo clock generator 26 via line 46. The lock detector/indicator circuit 52 provides a digitally derived "in lock" status indication when the system 8 is in the lock-up condition, via, for example, an LED device 56, and a logic level output via a line 58.

As depicted in FIG. 1, the eddy current brake servo system is particularly useful in locking two disk pack apparatus together to facilitate the recording and playback of very high speed data. For example, the servo system 8 of the invention is particularly useful in a parallel transfer disk (PTD) system where it is desirable to transfer high data rates. In such situations, due to the continuously incoming data, it is necessary to switch between at least two disk packs in order to provide continuous loading of data.

Thus FIG. 1 depicts a second eddy current brake servo circuit 10a and the associated disk pack apparatus 14a, wherein the external reference pulse on input line 38 is fed to the second servo circuit 10a. Thus the operation of the disk pack apparatus 14, 14a is locked together in response to the reference pulse on line 38. As indicated at 60, the reference pulse may also be fed to additional servo circuits and associated disk pack apparatus, whereby a plurality of individual disk packs apparatus, or pairs of disk pack apparatus, may be locked together relative to the reference pulse.

Referring now to FIG. 2, there is shown a schematic of the servo circuit 10 of FIG. 1 as employed with the eddy brake electromagnetic coil 24 and associated disk pack apparatus. Similar components in the Figures are similarly numbered. Accordingly, the system reference pulse is introduced on line 38 to the phase detector 34 of the phase loop 30, and particularly to an analog switch 62 thereof. Similarly the index pulse from the index pulse generator 28 (FIG. 1) is introduced on line 36 to the analog switch 62. The latter switch functions as a level converter to provide TTL compatability for the index and reference input pulses. The switch 62 is then coupled to the phase detector 34 which is digital positive edge triggered and operates between +5 volts and −5 volts. The −5 volts is supplied by an inverting unity gain operational amplifier 66, depicted in the lower right corner of FIG. 2, to provide tracking with the +5 volts.

The first output of the phase detector 34 is fed to the integrator 40, which is a bi-fet operational amplifier integrator circuit, which integrates the phase output pulses to produce a voltage that is proportional to the timing difference between the reference and the index pulses. This voltage is the phase loop 30 error signal which is fed to the summing amplifier 42 at a summing junction 68.

If the reference pulse on line 38 leads the index pulse on line 36, the phase detector output supplied to the integrator 40, has a 0 to +5 volt pulse whose width is equal to the time difference between the leading edge of the reference pulse and the leading edge of the index pulse. If the index pulse is leading, a 0 to −5 volt phase occurs at the output of the phase detector 34. When no difference exists between the reference and index pulses, the phase detector output is in a high impedance state.

The second output of the phase detector 34 is fed via line 54 of previous mention, to the lock detector/indicator 52, and comprises a 10 volt negative-going (+5 volts to −5 volts) reset pulse having a width equal to either difference. This reset pulse is used to indicate the lock-up condition.

The servo clock from the servo clock generator 26 (FIG. 1) is fed via the line 46 to the frequency discriminator circuit 44 of the velocity loop 32. The circuit 44 includes a divide-by-5 counter 70 which is clocked by the servo clock on line 46, and whose output is fed to a frequency-to-voltage converter circuit 72. Thus the 403.2 kHz clock is divided by five (80.64 kHz) and is fed to the converter circuit 72. The latter circuit linearly and proportionally converts frequency to voltage. An offset current is applied to the circuit 72, via an offset potentiometer circuit 74, to set the output of the converter circuit 72 to 0 volts when an 80.64 kHz signal is present at the converter circuit input. As the disk pack speed varies, the clock frequency also varies and the frequency discriminator 44 output voltage varies correspondingly. This output voltage is fed to the active low pass filter 48.

The low pass filter 48 provides amplification of the output voltage variations from the frequency discriminator 44 and provides phase compensation for the velocity loop 32. The output of the filter 48 is the velocity loop error signal which is fed to the summing amplifier 42 via the summing junction 68.

The summing amplifier 42 comprises an inverting operational amplifier which sums the phase loop error voltage and the velocity loop error voltage to produce a composite error signal. A potentiometer 76 in the feedback of the operation amplifier allows the overall servo gain to be adjusted. The nominal composite error voltage from the summing amplifier 42 is of the order of 35 millivolts (mv). A resistor/diode circuit 78 at the output of the summing amplifier 42 limits the peak error voltage to 700 mv providing nearly symmetrical up/- speed and down/speed control, and protects against excessive down/speed control.

The composite error signal from the summing amplifier 42 is fed to the eddy coil driver circuit 50, and particularly to an analog switch 80 at the input thereof which disconnects the error voltage during disk pack starting and run-up modes of operation. A "heads loaded" logic command on a line 82 to the analog switch 80, closes the switch to allow servo action to commence. When the disk pack motor is turned off, a second analog switch is energized via a disk pack motor "off" command via a line 84, whereby a deceleration voltage is applied to the coil driver circuit 50 via input 86. This simulates the conventional dynamic braking action which stops the disk pack apparatus 14 (FIG. 1).

The analog switch 80 output is coupled to an operational amplifier 88, and thence to a power transistor 90 which includes a current sensing resistor 92 to produce a control current to the brake coil 24 which is proportional to the composite error voltage fed to the eddy coil driver circuit 50.

The lock detector/indicator 52 of previous mention receives the reset pulse from the second output of the phase detector 34, as well as the servo clock on line 46, and provides a digitally derived "in lock" status indication via the LED device 56, as well as a logic level on the line 58. To this end, the 403.2 kHz clock is divided by two via a D-type flip-flop 94, which then clocks a decade counter 96. The reset pulse on line 54 is used to reset the counter 96. Thus the counter 96 is held in reset condition when the reset pulse from the phase detector 34 is at +5 volts, and is allowed to count when the reset pulse is at −5 volts. The output of the counter 96 is applied to a D-type flip-flop 98 and a transistor/RC time delay circuit 100. When the decade counter 96 is allowed to count to 5 (25 microseconds) the counter output goes high to set the time dealy 100 and cause the flip-flop 98 to set. The flip-flop 98 is continuously clocked by the 403.2 kHz clock but cannot be reset until the input thereto goes low and the time delay circuit 100 has discharged to less than one half the bias voltage thereof.

When the flip-flop 98 is in the reset state, the Q output thereof drives a transistor 102 to supply the "in lock" signal on line 58, i.e., to indicate the eddy current brake servo system is in the lock-up condition. When the system is not in lock, the $\overline{Q}$ output of the flip-flop 98 drives the LED device 56 to indicate that the system is out of sync.

After signals are applied to the servo circuit 10 and the system is in lock, the offset potentiometer circuit 74 is adjusted such that output of the phase loop 30 is between −1 volt and +1 volt. Also, the phase loop error signal pulse width should not exceed 10 to 15 microseconds peak, and the RMS error should be 2 to 5 microseconds. If the gain is too low, excessive phase error will occur during head seeking time periods, and if the gain is too high excessive high frequency jitter results.

What is claimed is:

1. A servo system for locking the rotation of at least two rotating apparatus together, the apparatus having an eddy current brake and associated eddy brake coil, comprising;

external reference clock generating means;

means operatively coupled to each rotating apparatus for rotating each apparatus at a speed slightly faster than the desired operating speed;

means coupled to each rotating apparatus for generating respective once-around index pulses indicative of an absolute rotational position of each rotating apparatus;

phase loop means including, a digital phase detector means for comparing the once-around index pulse with the external reference clock, and an integrator coupled to the phase detector means for generating a phase loop error signal indicative of any rotational positonal error between the apparatus in response to comparison of the once-around index pulses and the external reference clock;

means coupled to the rotating apparatus for generating a servo clock indicative of the speed of rotation thereof;

velocity loop means including a digital frequency to voltage converter and filter means for generating a velocity loop error signal proportional to the servo lock frequency and thus to the speed of rotation in response to the servo clock;

summing amplifier means coupled to the integrator and to the filter means to sum the error signals from the loops and to supply a continuous servo control current to each eddy brake coil to continuously brake the speed of the rotating apparatus to lock each of the absolute rotational positions to the external reference clock and thus to each other while maintaining the desired operating speed.

2. The system of claim 1 further including;

locking detector/indicator means for indicating out-of-sync and lock-up conditions in response to the phase detector means and the servo clock;

said lock detector/indicator means including, counter means operatively coupled to the servo clock and continuously counting during the out-of-sync condition; and flip-flop means coupled to the counter means, wherein the flip-flop means is reset to indicate a lock-up condition when the counter stops counting.

* * * * *